(12) United States Patent
Huang et al.

(10) Patent No.: US 10,996,240 B2
(45) Date of Patent: May 4, 2021

(54) METHOD FOR DETECTING CELL SURFACE HOLES USING ATOMIC FORCE MICROSCOPE

(71) Applicant: Institute of Basic Medical Sciences, Chinese Academy of Medical Sciences, Beijing (CN)

(72) Inventors: Bo Huang, Beijing (CN); Yuying Liu, Beijing (CN)

(73) Assignee: Institute of Basic Medical Sciences, Chinese Academy of Medical Sciences, Beijing (CN)

( * ) Notice: Subject to any disclaimer, the term of this patent is extended or adjusted under 35 U.S.C. 154(b) by 0 days.

(21) Appl. No.: 16/651,130

(22) PCT Filed: Sep. 27, 2018

(86) PCT No.: PCT/CN2018/107874
§ 371 (c)(1),
(2) Date: Mar. 26, 2020

(87) PCT Pub. No.: WO2019/062799
PCT Pub. Date: Apr. 4, 2019

(65) Prior Publication Data
US 2020/0271690 A1  Aug. 27, 2020

(30) Foreign Application Priority Data
Sep. 28, 2017  (CN) .......................... 201710899191.3

(51) Int. Cl.
*G01Q 60/34*  (2010.01)
(52) U.S. Cl.
CPC .................... *G01Q 60/34* (2013.01)

(58) Field of Classification Search
CPC ............................. G01Q 60/34; G01Q 60/24
USPC ............................................. 850/33, 37, 38
See application file for complete search history.

(56) References Cited

U.S. PATENT DOCUMENTS

2013/0145506 A1  6/2013  Dean et al.

FOREIGN PATENT DOCUMENTS

| CN | 1954064 A | 4/2007 |
| CN | 103197102 A | 7/2013 |
| CN | 105796535 A | 7/2016 |

(Continued)

OTHER PUBLICATIONS

Liu, et al ("Effects of artesunate on membrane surface morphology of human gastric cancer SGC-7901 cells observed under atomic force microscope," Chinese Journal of Pathophysiology, No. 6, Jun. 15, 2012) (Year: 2012).*

(Continued)

*Primary Examiner* — Michael Maskell
(74) *Attorney, Agent, or Firm* — Edell, Shapiro & Finnan, LLC (57) ABSTRACT

A method for detecting pores on cell membrane using an atomic force microscope, comprising the steps of: providing cells; fixing the cells in place; and observing the cells by means of an atomic force microscope. The pores are present in the cell membrane or pass through the cell membrane. By means of the present method, the presence of pores in the cell membrane can be accurately observed, and the size and depth of the pores can be accurately determined.

6 Claims, 5 Drawing Sheets

(56) References Cited

FOREIGN PATENT DOCUMENTS

CN    106199078 A    12/2016
CN    106841684 A     6/2017

OTHER PUBLICATIONS

Liu, et al., "Effects of Artesunate on Membrane Surface Morphology of Human Gastric Cancer SGC-7901 Cells Observed Under Atomic Force Microscope", Chinese Journal of Pathophysiology, vol. 6, pp. 974-979 (Jun. 2012).
International Search Report in corresponding International Patent Application No. PCT/CN2018/107874, dated Dec. 28, 2018.

* cited by examiner

PBS  SLO  Per

Fig 1A  Fig 1B  Fig 1C

PBS  SLO  Per

Fig 1D  Fig 1E  Fig 1F

PBS  SLO  Per

METHOD FOR DETECTING CELL SURFACE HOLES USING ATOMIC FORCE MICROSCOPE

CROSS REFERENCE TO RELATED APPLICATIONS

This application is a National Phase application of International Application No. PCT/CN2018/107874, filed on Sep. 27, 2018, which claims priority under 35 U.S.C. § 199 to Application No. CN 201710899191.3 filed on Sep. 28, 2017, the contents of each of which are hereby incorporated by reference in their entireties.

FIELD OF THE INVENTION

The application relates to the field of biotechnology. More specifically, the application relates to a method for detecting surface features of cells, particularly living cells, using atomic force microscope. In particular, it relates to a method for detecting cell surface pores, especially living cells, using atomic force microscope.

BACKGROUND OF THE INVENTION

Cell death begins with the formation of pores on cell membrane, and then the cells are killed. The formation of pores on cell membrane plays an important role in immune surveillance, pathogen clearance, and inflammatory diseases.

Currently, several types of molecules have been identified which are capable of punching pores on cell membrane, for example, perforins released by T cells or NK cells, and GSDMD/GSDME activated by inflammasome. However, to date, there is not any report showing the pores on cell membrane. There is a report showing the pores on artificially synthetic lipid membrane (The EMBO Journal. 2016; 35: 1766-1778), however, the artificially synthetic lipid membrane is not a real cell membrane.

Cells can be non-invasively scanned with atomic force microscope (AFM) and topographic image of cells with at least nanometer resolution can ultimately be obtained by sensing and amplifying the interaction force between the tip probe on the cantilever and the cell to be tested with microcantilever.

Atomic force microscopy involves the following principle: an atomic force microscope includes two key portions: probe and scanner. When the probe approaches to a sample to certain extent, if there is a physical quantity $P=P(z)$, which is sufficiently sensitive and can be functionally varied with the distance between the probe and the sample, then the physical quantity can be used as a feedback system (FS). The distance between the probe and the sample can be controlled by moving the scanner, thereby to plot the surface features of the material.

In an example of topographic imaging, in order to obtain surface topographic information, under the control of the scanner, the tip of the probe is moving within a range close enough to the surface of the sample, so as to detect the interaction between the probe and the sample surface; within the scope of interaction, a signal generated by the probe indicates the magnitude of the interaction that varies with the probe-to-sample distance. This signal is referred to as Detector Signal.

In order to correlate the detector signal with the actual interaction, it is necessary to pre-determine a reference threshold (Setpoint). When the probe enters into the imaging area by moving the scanner, a detector signal is detected and compared to the threshold by the system. When they are equal, the scanning process is started.

Under the control of the scanner, the probe moves precisely above the surface of the sample along a predetermined track. When the probe encounters a change in surface topography, the detector signal will change due to the changes in the interaction between the probe and the sample. Therefore, the difference from the threshold, referred to as Error Signal, will be generated. Z-direction feedback is applied in the atomic force microscopy to ensure that the probe accurately tracks the ups and downs of surface topography. The Z-direction feedback loop continuously compares the detection signal to the threshold. If the two are different, a voltage will be applied onto the scanner to increase or decrease the distance between the probe and the sample, so that the error signal is returned back to zero. At the same time, an atomic force microscope image will be generated from the applied voltage signal by using a software system.

At present, atomic force microscopy has been reported to be used to detect the rigidity of cervical exfoliated cells (CN104655879); CN105527462A discloses a method for measuring the action potential and pulse power of single living cardiomyocyte with atomic force microscope. CN106199078A discloses a method for rapidly and accurately characterizing the surface morphology of living cells by atomic force microscopy. Ma Yamin et al. (Chinese Journal of Laboratory Diagnosis, 2005, 9(04): 514-518; Master's thesis "AFM Observation of Eight Kinds of Solutions and Human Erythrocytes Disposed by These Solution", 2004) observed the microstructure on the surface of human erythrocytes in various solutions with atomic force microscopy. They observed that the erythrocytes displayed biconcave-disk shape, the microstructure of the surface of the cell membrane was clear, and pores and protrusions were visible on the surface of the cell membrane.

However, one cannot observe the microstructure of the cell surface (for example, tiny pores formed at the early stage of cell death) with the above methods. According to the method described by Ma Yamin et al. 2005, the "pores" on the surface of erythrocytes were observed, however the term "pores" as used therein precisely should be interpreted as concave formed by folding of the erythrocyte membrane, and the integrity of cellular bilayer has not been destroyed. Further, the smaller pores (for example, tiny pores formed at the early stage of cell death) cannot be observed with the detection parameters used therein. In addition, erythrocytes do not have nucleus, and the surface force thereof during AFM detection are different from that of living cells with nucleus. The positions of cells with nucleus have higher rigidity, while cells without nucleus are relatively soft, thereby the parameters used in AFM detection are rather different.

In view of the above reason, there is still a need in the art for a method with higher resolution to detect living cell surface pores.

SUMMARY OF THE INVENTION

According to some embodiments, the present disclosure provides a high resolution method for observing pores on cell membrane by atomic force microscope.

According to some embodiments, the present disclosure provides a method for detecting pores on cell membrane, comprising the steps of:
1) providing cells;

2) optionally fixing or not fixing the cells; and
3) observing the cells with atomic force microscope.

In some embodiments, the cells can be provided by any method known in the art including, but not limited to, providing the cells after cell culture, isolation, washing; alternatively, the cells are obtained and isolated from an organism.

In some embodiments, the provided cells are living cells. The cells are still alive even if they are about to enter into, or have entered into the process of cell necrosis, apoptosis (programmed death) or pyroptosis.

In some embodiments, the provided cells may be animal, plant or microbial cells. The methods of the present disclosure are independent of the particular species of cells, and all of the cells may be observed by the methods of the present disclosure as long as they have bilayer cell membrane structure. Those skilled in the art understand that some plant cells have cell walls and these plant cells are still suitable for use in the assays of the present disclosure after removing the cell wall with enzymes.

In some specific embodiments, the provided cells contain nucleus.

In some embodiments, the cells are fixed to make them more convenient to be observed by the following AFM. Thus, any fixing method compatible with AFM observation known in the art can be used in the methods of the present disclosure. For example, in some specific embodiments, the cells are fixed for 5 to 15 minutes with 4% paraformaldehyde by volume.

Optionally, the fixed cells are naturally air dried at ambient temperature (e.g., 18 to 28° C.) prior to observing the cells under atomic force microscopy.

In some embodiments, the pores are present within or across the cell membrane.

In some embodiments, the formation of pores involves a destroy of integrity of the cell membrane; or a destroy of the continuity of the cell membrane bilayer.

In some embodiments, the atomic force microscope is set to Tapping Mode.

In the field, Peakforce Tapping Mode involves the following principles: in the system, a frequency of 1 to 8 kHz is used to plot a curve of force across the surface, peak force is used as feedback, and peak force between the probe and the sample is kept constant by moving the scanner, thereby the surface topography will be reflected.

The advantage of the Peakforce Tapping Mode is in that the interaction between the probe and the sample could be very small, since the force is directly used as feedback, making it possible to image a very sticky and soft sample. In addition, the mechanical information of the surface may be obtained by direct quantification with the force as feedback directly.

In some embodiments, the probe has an elastic constant of from $0.1$ N m$^{-1}$ to $1$ N m$^{-1}$, preferably from $0.1$ N m$^{-1}$ to $0.4$ N m$^{-1}$.

In some embodiments, the probe has a selected curvature radius of from 2 nm to 70 nm; preferably from 2 nm to 20 nm; more preferably from 2 nm to 5 nm.

In some embodiments, the working temperature of the atomic force microscope is set to 18° C. to 28° C., more preferably 20° C. to 24° C.

In some embodiments, the imaging force of the atomic force microscope is set to 0.5 nN to 10 nN; preferably 0.5 nN to 6 nN.

In some embodiments, the imaging frequency of the Peakforce Tapping Mode is set to 1 kHz to 8 kHz; preferably 1 kHz to 2 kHz.

In some embodiments, the imaging amplitude of the Peakforce Tapping Mode is set to 5 nm to 200 nm; preferably 50 nm to 150 nm.

In some embodiments, the imaging gain of the Peakforce Tapping Mode is set to 2 to 40; preferably 20 to 30.

In some embodiments, the pores of the cells are pores generated due to the following factors: the cells are ready to enter or have entered into the process of cell death; physical factors; chemical factors.

In some embodiments, the cell death may be cell necrosis; or apoptosis (also referred to as programmed death).

In some embodiments, physical factors include, but are not limited to, mechanical force, radiation, or temperature.

In some embodiments, the chemical factor is selected from the group consisting of perforin, granzyme, GSDMD/E and denaturing agent (such as Triton X-100).

DETAILED DESCRIPTION OF THE INVENTION

Example 1

1. Cell Culture

OVA-B16 cells (melanoma cell line) were cultured in 35 mm cell culture dishes.

The cells were stimulated with PBS (control group), recombinant perforin (SLO group), or perforin isolated from T cells (Per group) respectively for 15 minutes.

2. Sample Processing

After the above treatment, the cells were washed twice with PBS, then fixed with 4% paraformaldehyde for 10 minutes, air-dried at room temperature and then observed under atomic force microscope.

3. Parameter Settings of Atomic Force Microscope (AFM)

The force-distance curve-based AFM was an atomic force microscope from original Bruker Dimension ICON, which was set in Peakforce Tapping Mode.

The atomic force microscope was equipped with a 90 μm piezoelectric scanner.

The probe cantilever (Bruker ScanAsyst-Air type) used in the AFM: a silicon probe with the nominal value of elastic constant of $0.4$ N m$^{-1}$ and the nominal value of curvature radius of 2 nm.

The force-distance curve-based AFM had a working temperature of room temperature of 20-24° C. and was placed in a noise-isolating box.

The imaging force was set to 1 nN.

The frequency and amplitude of the Peakforce Tapping Mode were set to 2 kHz and 50 nm, respectively; the captured images were analyzed with Nanoscope software.

In order to detect the depth and width of each pore in the image of Tapping mode, each image needs to be flattened. Detection of the pore diameter includes detection of the long axis and the short axis. The depth of the pore should be measured from the most prominent edge to the most concave edge.

4. Test Results

Figure 1A:
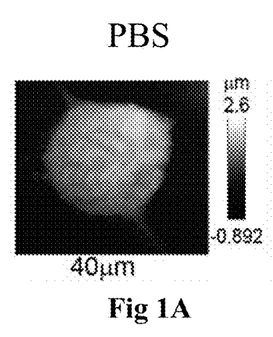
FIGS. 1A to 1I: AFM topographic images of OVA-B16 cells treated with SLO, Per, PBS.
Figure 1B:
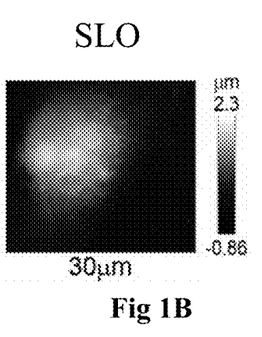
Figure 1C:
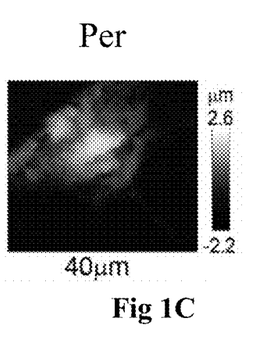
Figure 1D:
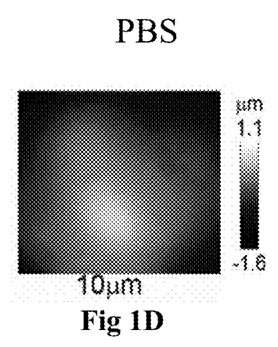
Figure 1E:
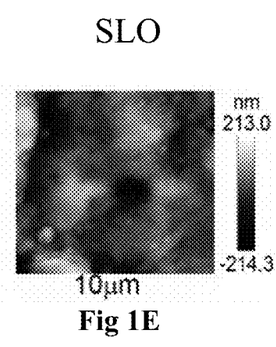
Figure 1F:
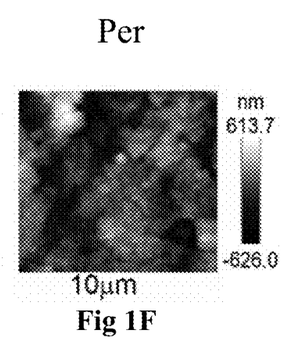
Figure 1G:
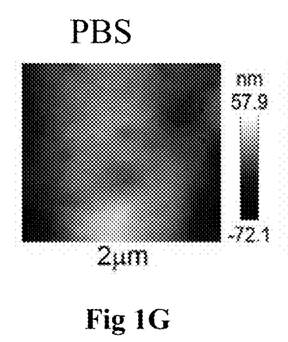
Figure 1H:
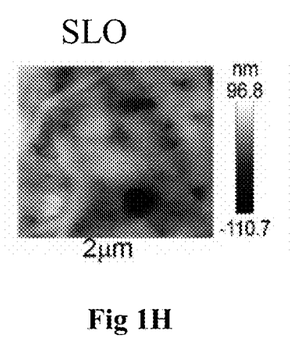
Figure 1I:
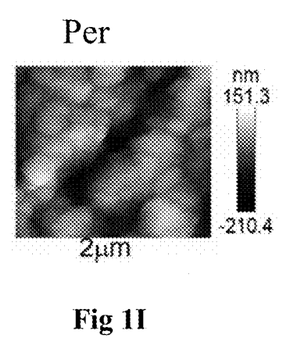

The general AFM topographic image showed that the surface of OVA-B16 cells treated with SLO (FIG. 1B, 1E, 1H) or Per (FIG. 1C, IF, 1I) was rougher than that of the control group (FIG. 1A, 1D, 1G).

Figure 2A:
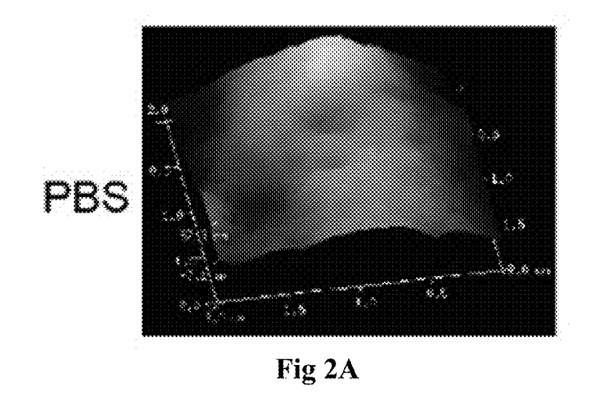
FIGS. 2A to 2C: Local enlarged AFM images (2 μm).
Figure 2B:
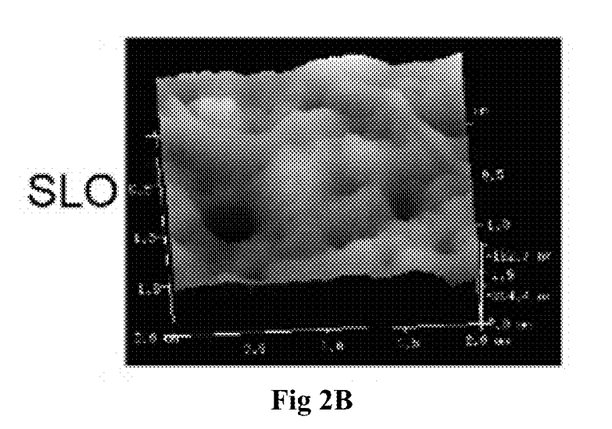
Figure 2C:
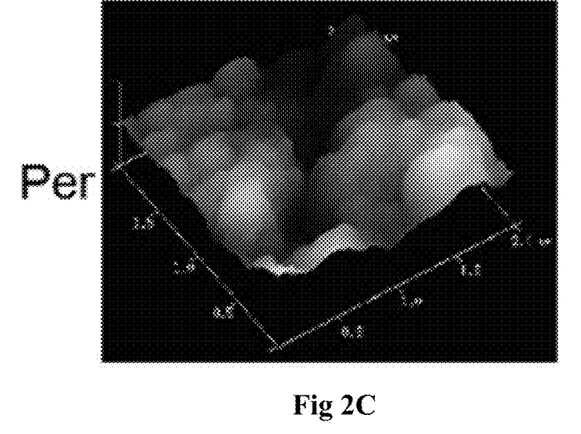
Figure 3A:
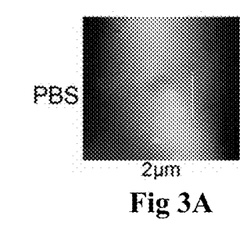
FIGS. 3A to 3L: Local cell topographic images and its cross-section analysis.
Figure 3B:
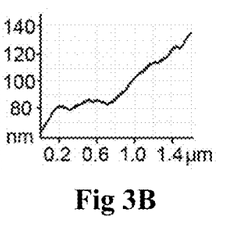
Figure 3C:
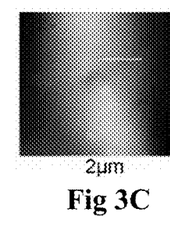
Figure 3D:
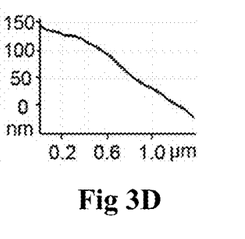
Figure 3E:
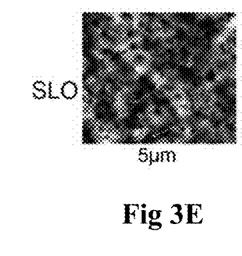
Figure 3F:
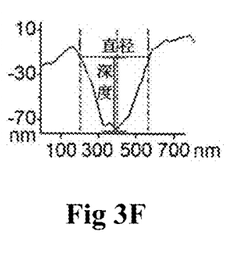
Figure 3G:
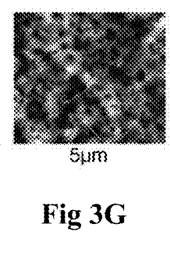
Figure 3H:
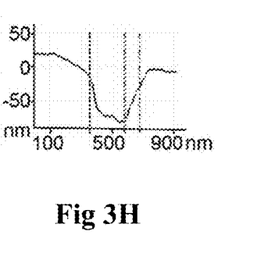
Figure 3I:
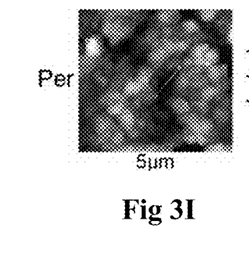
Figure 3J:
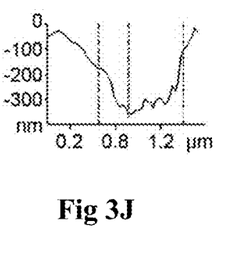
Figure 3K:
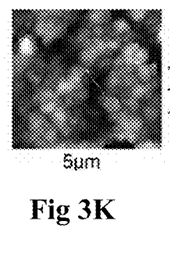
Figure 3L:
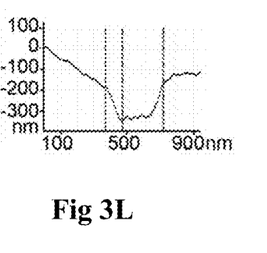

The AFM image was further locally enlarged (2 μm). The results showed that in the SLO- or Per-treated group, the formation of black pore was significantly observed on the surface of the cell membrane, whereas the formation of pore was not observed in the control group (FIGS. 2A to 2C).

Figure 5A:
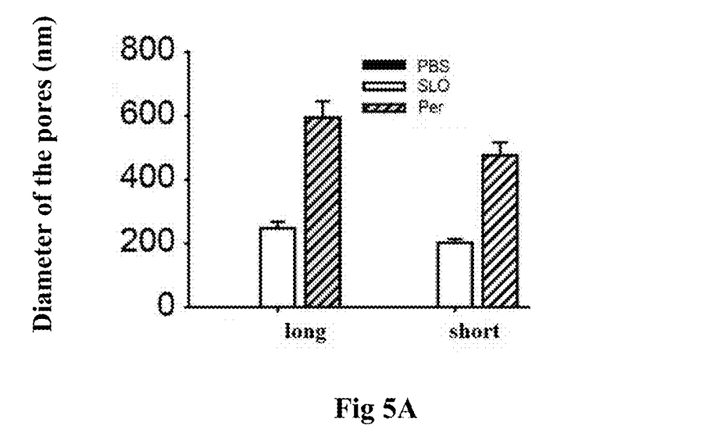
FIGS. 5A to 5B: Comparison of sizes of pores on cell membrane.
Figure 5B:
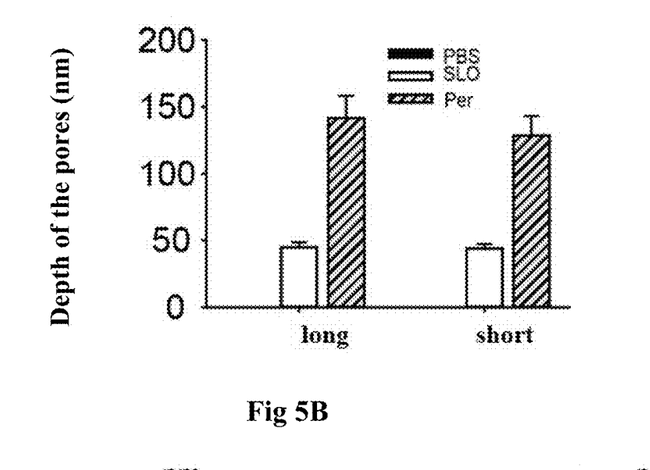

The three-dimensional AFM topographic image of the cells further confirmed the presence of significant pores on the cell membrane in the SLO- or Per-treated group. We then performed a cross-section analysis of these high-resolution local cell topographic images. The results showed that in the control group, the cross-section showed that the selected area was on a slope (FIGS. 3A to 3D). However, in the SLO-treated group, the cross-section plot showed significant pores in the indicated area, with a long axis diameter of 248±19 nm, a short axis diameter of 202±11 nm, and with a pore depth of approximately 50 nm (FIGS. 3E to 3H; FIGS. 5A to 5B). The Per treatment resulted in a further increase in the pore size on the cell membrane, with a long axis diameter of 594±50 nm, a short axis diameter of 476±40 nm, and with a pore depth of approximately 150 nm (FIGS. 3I to 3L; FIGS. 5A to 5B).

Figure 4:
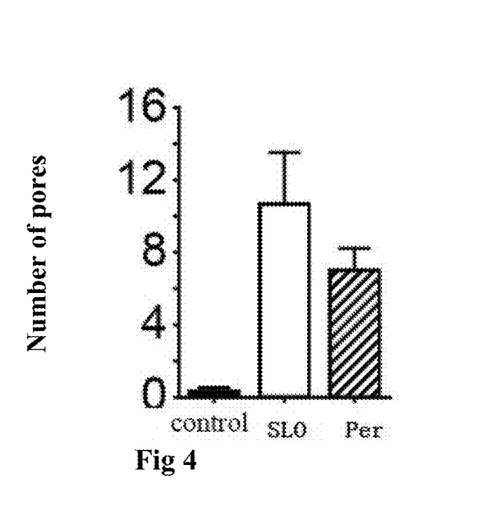
FIG. 4: Number of pores on the cell membrane.

Furthermore, we counted the number of pores on the cell membrane and found that in a region of 5 μm×5 μm$^2$, there was few pore formation in the control group. However, 6-10 pores have been formed in the SLO- or Per treated group (FIG. 4).

The resolution can reach a level of 1 nm.

The above results fully confirmed that we can clearly observe the presence of pores on the membrane of OVA-B16 cells and can accurately know the size and depth of the pores by AFM detection.

Example 2

1. Cell Culture

OVA-B16 cells (melanoma cell line) were cultured in 35 mm cell culture dishes. The cells were stimulated for 15 minutes with PBS (control group) and recombinant perforin (SLO group), respectively.

2. Sample Processing

After the above treatment, the cells were washed twice with PBS, and then air-dried at room temperature for observation under an atomic force microscope.

3. Parameter Settings of Atomic Force Microscope (AFM)

The parameters were the same as those described in Example 1, except that the curvature radius of the probe was about 63 nm.

4. Test Results

Figure 6A:
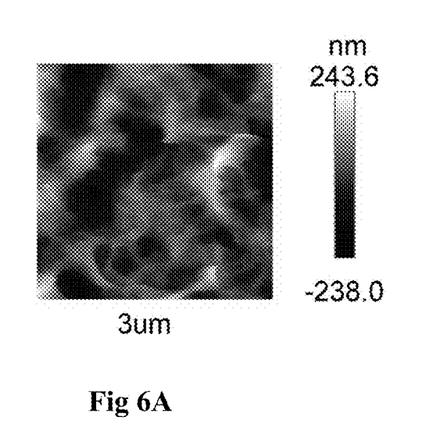
FIGS. 6A to 6B: AFM topographic images of OVA-B16 living cells treated with SLO or PBS.
Figure 6B:
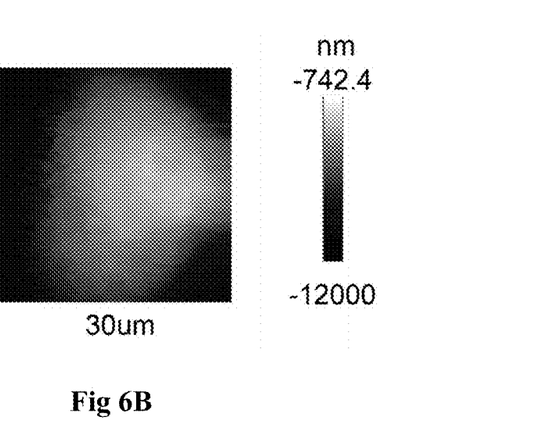

The same topographic results as in Example 1 were also obtained by detecting the surface of living cells with AFM. The general AFM topographic image showed that pores were significantly present on the OVA-B16 cells treated with SLO (FIG. 6A). The surfaces of the OVA-B16 cells treated with SLO were rougher than that of the control group (FIG. 6B). The resolution is the same as described in Example 1.

The invention claimed is:

1. A method for detecting pore(s) on cell membrane, comprising the steps of:
providing cell(s);
optionally, fixing the cell(s); and
observing the cell(s) with atomic force microscope;
wherein the pore(s) is/are present within or across the cell membrane;
wherein the pore(s) involve(s) the destroy of the integrity of the cell membrane;
or involves the destroy of the continuity of the cell membrane bilayer;
the atomic force microscope is set as follows:
Peakforce Tapping Mode;
elastic constant of probe is from 0.1 N m$^{-1}$ to 1 N m$^{-1}$, preferably from 0.1 N m$^{-1}$ to 0.4 N m$^{-1}$;
the curvature radius of probe is from 2 nm to 70 nm; preferably from 2 nm to 20 nm; more preferably from 2 nm to 5 nm;
working temperature: 18° C. to 28° C., more preferably 20° C. to 24° C.;
imaging force: 0.5 to 10 nN; preferably 0.5 to 6 nN;
frequency: 1 to 8 kHz; preferably 1 to 2 kHz;
amplitude: 5 to 200 nm; preferably 50 to 150 nm;
gain: 2 to 40; preferably 20 to 30.

2. The method of claim 1 wherein:
the cell is living cell;
the cell is selected from the group consisting of animal cell, microbial cell, plant cell, or the combination thereof;
preferably, the cell is living cell with nucleus.

3. The method of claim 1, wherein
the pore is selected from any one of the following: pore generated during the process of cell death; pore generated by physical factor; pore generated by chemical factor, or the combination thereof;
the cell death is cell necrosis, apoptosis or pyroptosis;
preferably, the physical factor is selected from the group consisting of mechanical force, radiation, temperature, or the combination thereof;
preferably, the chemical factor is selected from the group consisting of perforin, granzyme, GSDMD/E, denaturing agent, or the combination thereof;
wherein the denaturing agent is Triton X-100.

4. The method of claim 1, wherein the fixing is carried out by the following steps: fixing the cell(s) with a fixing solution for 5 minutes to 15 minutes;
preferably, the fixing solution is selected from any one of the following: 4% paraformaldehyde by volume, alcohol, glacial acetic acid solution, modified Carnot's fixing solution, or the combination thereof.

5. The method of claim 4, wherein
the method further comprises a step of drying at 18° C. to 28° C. after the fixing step.

6. The method of claim 1, comprising the steps of:
providing cell(s);
optionally, fixing the cell(s) with 4% paraformaldehyde for 8 to 11 minutes;
drying the cell(s) at 18° C. to 28° C., and
observing pore(s) of the cell(s) with an atomic force microscope;
wherein the pore(s) is/are present within or across the cell membrane;
wherein the pore(s) involve(s) destroy of the continuity of the cell membrane bilayer;
the atomic force microscope is set as follows:
Peakforce Tapping Mode;
elastic constant of probe is 0.4 N m$^{-1}$;
the curvature radius of probe is 2 nm or 63 nm;
working temperature: 20° C. to 24° C.;

imaging force: 1 nN;
frequency: 2 kHz;
amplitude: 50 nm;
gain: 20 to 30.

* * * * *